United States Patent [19]

Broome et al.

[11] Patent Number: 4,539,574

[45] Date of Patent: Sep. 3, 1985

[54] PEN CAPPING MECHANISM

[75] Inventors: Lloyd N. Broome, Fullerton; James Lawrence, Irvine, both of Calif.

[73] Assignee: Sanders Associates, Inc., Nashua, N.H.

[21] Appl. No.: 538,863

[22] Filed: Oct. 4, 1983

[51] Int. Cl.³ .................. G01D 15/16; G01D 15/18
[52] U.S. Cl. ............................ 346/139 R; 346/140 R
[58] Field of Search .................... 346/139 R, 140 R

[56] References Cited

U.S. PATENT DOCUMENTS 4,173,020 10/1979 Anderka ...................... 346/140 R

OTHER PUBLICATIONS

Hawley, Condensed Chemical Dictionary, 9th Edition, May 1980.

Primary Examiner—Thomas H. Tarcza
Assistant Examiner—M. J. Reinhart
Attorney, Agent, or Firm—Louis Etlinger; William F. Porter, Jr.

[57] ABSTRACT

A pen capping mechanism for use in an X, Y graphics plotter, or the like, having a plurality of pens with writing tips requiring sealing between periods of use. A flat bar of plastic is provided as a slider member with an upper surface adapted to sealably mate with the tips of the pens. The slider member is supported for longitudinal movement on a support track and is moved between positions by an operator connected thereto. The member has a plurality of bores therethrough through which respective ones of the pen tips can pass in order to write. The bores are positioned such that as the member is moved through the various operative positions, respective ones of the bores come into alignment with a pen tip such that only one pen tip at a time is in alignment with one of the bores. For minimum required movement, the bores are all of a diameter d and are offset from one another in equal steps of distance d so that moving the member a step of distance d will seal one pen tip which had been exposed and seal the next adjacent one thereto.

16 Claims, 9 Drawing Figures

PEN CAPPING MECHANISM

BACKGROUND OF THE INVENTION

The present invention relates to pens as employed in X, Y graphic plotters, or the like, and more particularly, to capping mechanisms for selectively sealing and unsealing the tips of the pens for writing purposes.

X, Y plotting mechanisms that are used in some applications, such as engineering drawing production, require the use of pens with liquid ink. Between periods of use, such pens must have the writing tips thereof sealed or the ink adjacent the tip will dry out causing skips in the lines being drawn upon initial startup of a line from a pen which has been unused for a period of time, or, in the extreme, complete lack of ink flow from the pen. In the past, prior art plotters employing such pens have employed complex sealing mechanisms for each pen on an individual basis. Thus, for example, in a four pen plotter there would be four sealing members, four actuating bars connected to the four sealing members, and a complex mechanism for selectively recapping one pen while uncapping another. Such complex mechanisms typically add greatly to the cost of the device while simultaneously increasing the probability and possibility of failure with associated downtime of the entire plotter.

Also, the prior art systems are dedicated to a fixed pen configuration and are not easily adapted to new configurations, in particular, to mixing pens requiring sealing and those which are not sealed, such as ball point and felt tipped.

Wherefore it is the object of the present invention to provide a capping mechanism for multi-pen plotters and the like which is simple, of low cost, and reliable and which provides for easy configuration changeability.

SUMMARY

The foregoing objectives have been met in a graphic plotter having a plurality of pens with writing tips by the pen capping mechanism of the present invention comprising a slider member adapted to move through an operative path and having an upper surface adapted to sealably mate with the tips of the pens, the member having a plurality of bores therethrough through which respective ones of the pen tips can pass to write, the bores being positioned such that as the member is moved through the operative path, respective ones of the bores come into alignment with a pen tip such that only one pen tip at a time is in alignment with one of the bores; support means for supporting the slider member for sliding movement adjacent the pen tips.

In the preferred embodiment, the slider member is removable from the support means for easy replacement to change configurations. Additionally, the operative path is divided into equal steps and the bores are offset from alignment from respective ones of the pen tips in units of the step whereby moving the member one of the steps will seal the tip of one of the pens and unseal another.

DESCRIPTION OF THE PREFERRED EMBODIMENT

Figure 1:
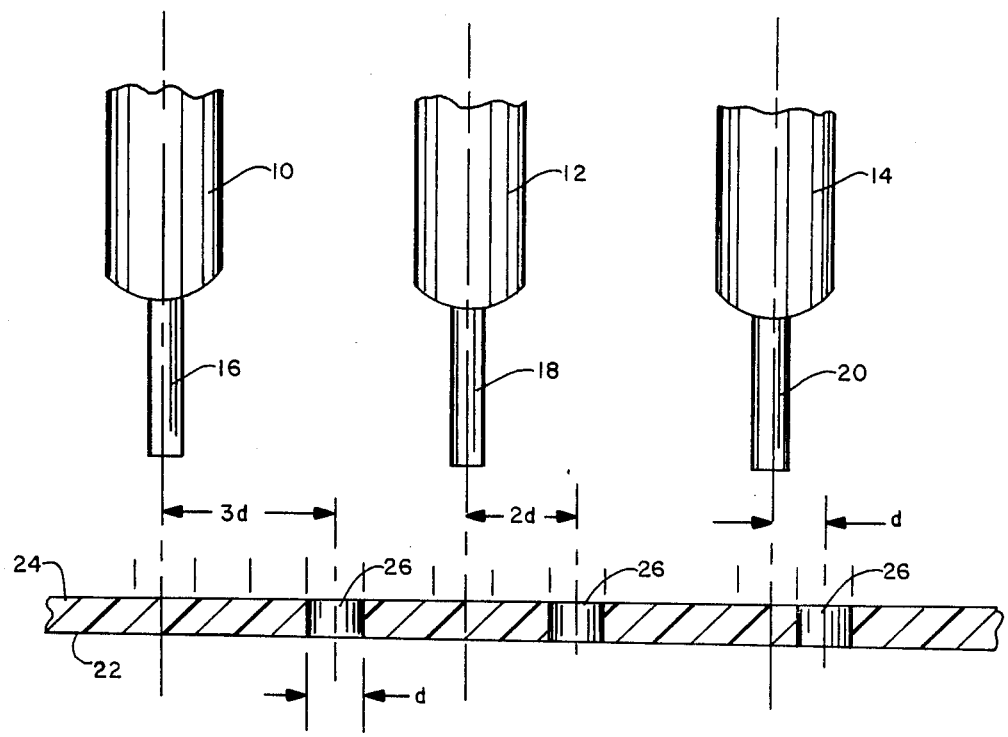
FIG. 1 is a simplified drawing of a plurality of pen tips showing the alignment of the bores of the slider member of the present invention thereto.

Turning first to FIG. 1, three pens 10, 12 and 14 having, respectively, writing tips 16, 18 and 20 are shown above a slider member 22 as employed in the present invention with one possibility for sizing and distance thereof marked off. This configuration provides the benefits of the present invention with minimum movement. Slider member 22 is of plastic or the like having a smooth upper surface 24 adapted to sealably mate with the ends of the writing tips 16, 18, 20. Member 22 has a plurality of bores 26 therethrough. The bores 26 are of a diameter d such that the writing tips 16, 18, 20 can pass therethrough for writing purposes. The bores 26 are offset from alignment with the writing tips 16, 18, 20 in increasing steps equal to the diameter d. That is, the writing tip 16 of pen 10 is offset from alignment with its bore 26 by one diameter d, tip 18 of pen 12 is offset by $2d$, while tip 20 of pen 14 is offset by $3d$.

Figure 2:
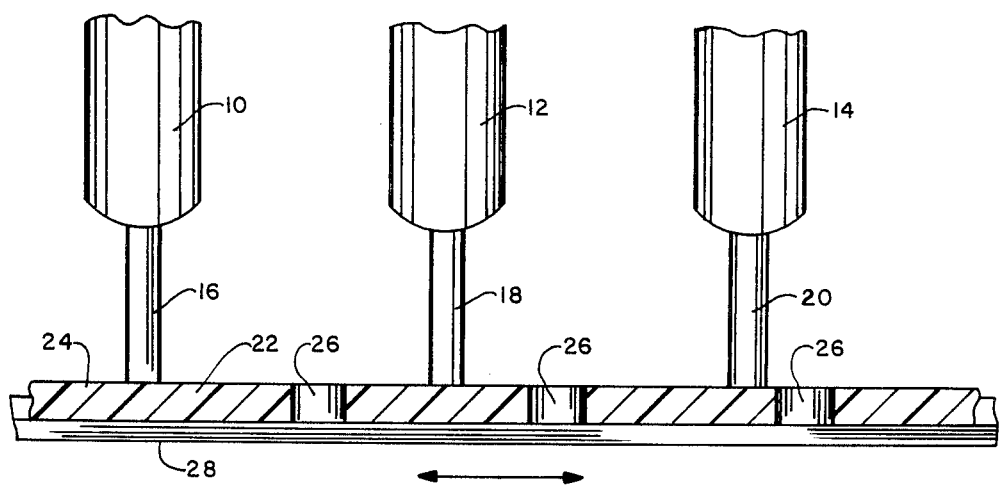
FIG. 2 is a simplified drawing showing the slider member and track positioned to seal and unseal the tips of the pens of FIG. 1.

Turning now to FIG. 2, the slider member 22 of FIG. 1 is shown in its operative position being held adjacent the writing tips 16, 18, 20 by a track 28 such that the tips 16, 18, 20 are sealably disclosed against the upper surface 24. The bores 26 are initially aligned as shown in FIG. 1. The track 28 is part of the movable writing head (not shown) which holds and operates the pens 10, 12, 14. The slider member 20 is slid throughout its operative path by the writing head moving to the extreme ends of its travel to known positions whereby stops (not shown) at the ends push against the slider member 22 and urge it to a desired position to expose the desired pen tip. It should be noted at this point that in a commercial embodiment as manufactured and tested by the assignee of this application (to be described in greater detail hereinafter) the slider member 22 is a rectangular member adapted to slide in a longitudinal operative path. The bores 26 thereof are placed in longitudinal alignment as are the pens 10, 12, 14. The same principle would, of course, apply where the pens 10, 12, 14 were placed on a circular segment and the bores 26 were disposed along a circle and adapted for rotation about the center of the circle.

Figure 3:
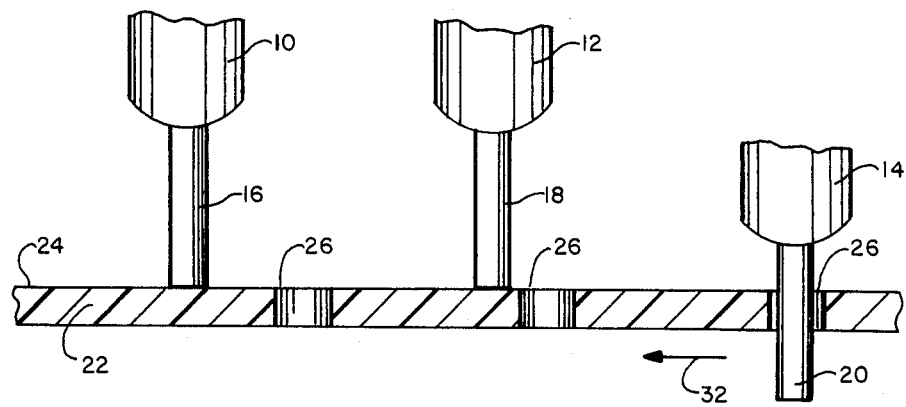
FIGS. 3–5 are simplified drawings showing the sequence of unsealing the pens of FIGS. 1 and 2.
Figure 4:
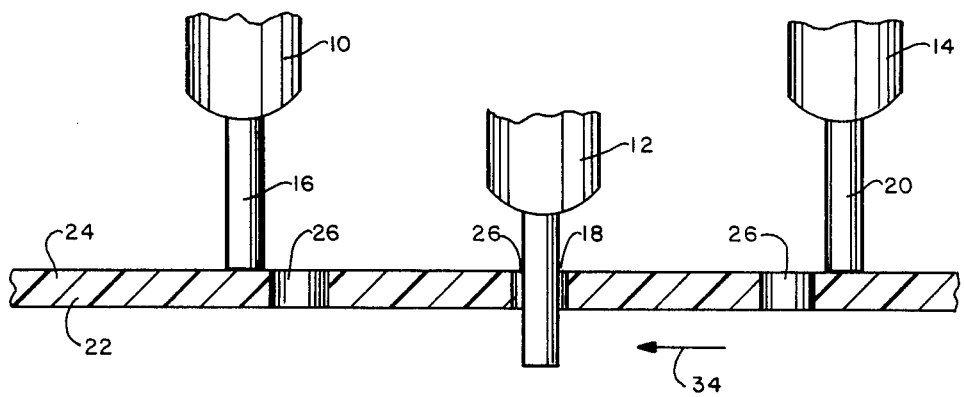
Figure 5:
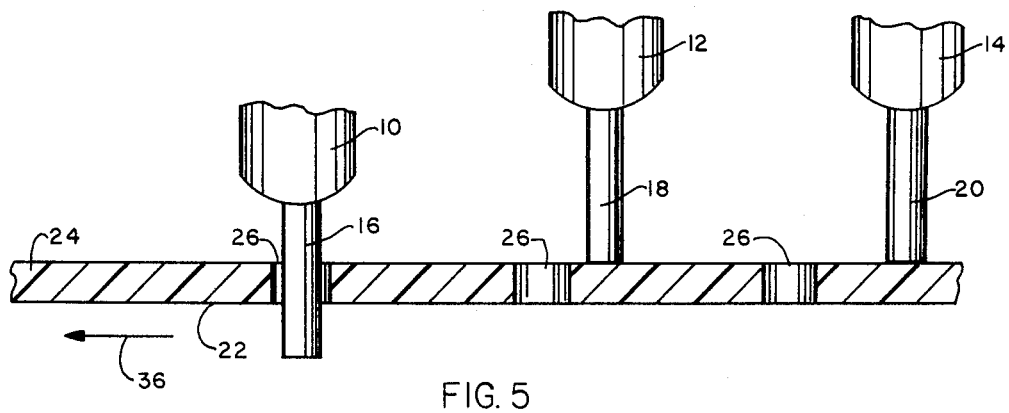

Turning now to FIGS. 3–5, the operation of the present invention in the configuration and spacing of FIGS. 1 and 2 can be seen. In FIG. 3, the slider member 22 has been moved one position (i.e., a distance d) in the direction of the arrow 32. By so doing, writing tip 16 of pen 20 has been placed in alignment with the bore 26 previously next adjacent thereto. As shown, pen 10 can be moved by an appropriate mechanism (not shown) of the writing head so as to pass the writing tip 16 through the bore 26 for writing purposes.

In FIG. 4, the slider member 22 has been moved another step d in the direction of the arrow 34 (with pen 10 retracted, obviously) whereby writing tip 16 is once again sealed and writing tip 18 is unsealed and placed in alignment with its previously next adjacent bore 26.

In similar fashion, a third step movement of distance d by slider member 22 in the direction of arrow 36 reseals writing tips 18 and unseals writing tip 20.

Thus, it can be seen that by employing the sealing mechanism of the present invention, a single sealing member can be employed to seal and unseal a plurality of pens. In the tested embodiment, it was preferred that a detent mechanism comprising a spring biased ballbearing to mate with suitably aligned pockets in the slider member 22 (not shown) be provided to hold the slider member 22 in its various positions to prevent inadvertent movement thereof.

By simply changing the slider member 22 (which slides into and out of the track 28) the configuration is quickly and easily changed. For example, by disposing an oval opening or slot beneath a pen position, that pen will go unsealed as the slider member 22 is moved to seal and unseal other pens.

Figure 6:
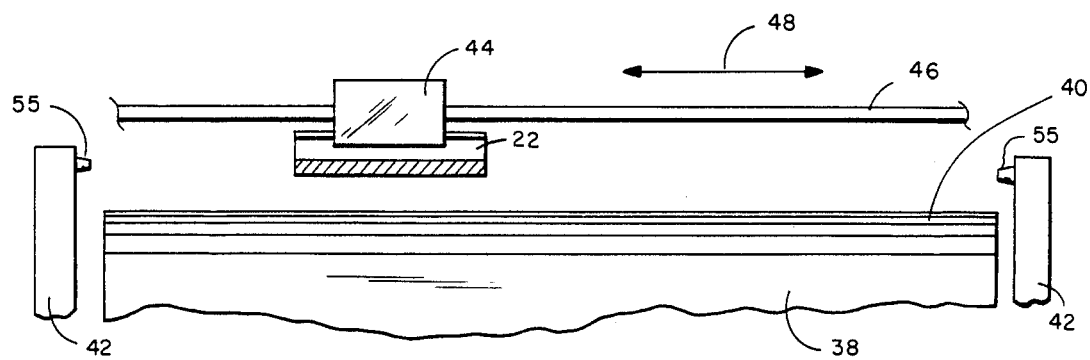
FIG. 6 is a partially cutaway, simplified drawing of a plotter head incorporating the present invention.
Figure 7:
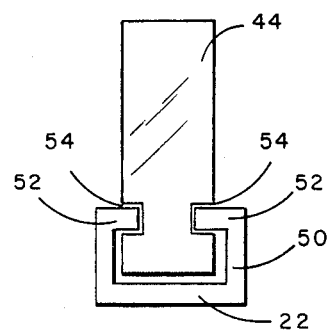
FIG. 7 is an end view of the plotter head of FIG. 6.
Figure 8:
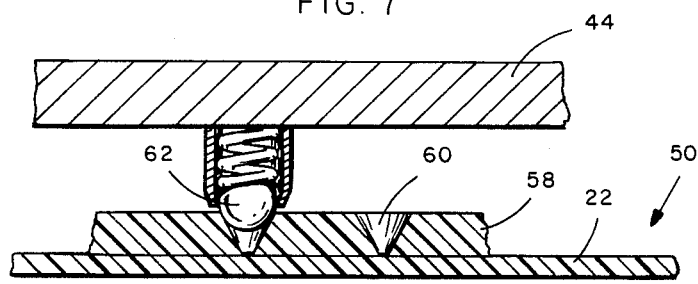
FIG. 8 is an enlarged cutaway drawing of the detent mechanism employed in the pen capping mechanism of the plotter head of FIGS. 6 and 7.
Figure 9:
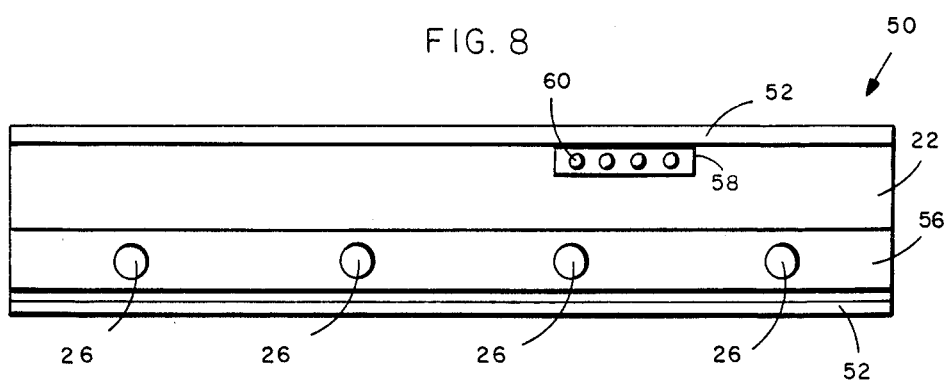
FIG. 9 is a plan view of the slider member of the pen capping mechanism employed in the plotter head of FIGS. 6 and 7.

Turning now to FIGS. 6–9, the present invention is shown as incorporated into an X, Y plotter as manufactured by the assignee of this application. The basic environment and mechanism is shown in FIG. 6. The plotter paper 38 is supported on a roller 40 disposed between a pair of side members 42. A plotter writing head 44 containing a plurality of pens (not shown) disposed in the manner of the pens 10, 12, 14 of FIGS. 1–5 is mounted on a support bar 46 for traverse movement as indicated by the arrow 48 by an appropriate drive mechanism (also not shown). As best seen in FIG. 7, the pen capping mechanism of the present invention comprises a channel member 50 with a pair of opposed lips 52 adapted to slidably fit into grooves 54 provided therefor in the bottom edge of the plotter head 44. The bottom of the channel member 50 acts as the slider member 22. Positioning of the channel member 50, and therefore the slider member 22, is accomplished by moving the channel member against one or both of the stops 55 to urge the channel member 50 to a desired position, as described earlier herein. As can be best seen in FIG. 9, the bores 26 are provided therethrough adjacent the front edge to be in alignment with the pens. It was found that preferred operation could be achieved by disposing a strip of Teflon tape 56 on the surface of the slider member 22 contacting the tips of the pens. A detent block 58 is positioned adjacent the back edge of the slider member 22. The detent block 58 contains indentations 60 adapted to receive a spring-loaded ballbearing 62 carried by the bottom of the plotter head 44 as best seen in FIG. 8. As mentioned briefly earlier herein, the detent action assures proper alignment and proper maintenance thereof between the pen tips and the bores 26 as the channel member 50 is moved to seal and unseal the pens in the manner previously described herein with respect to FIGS. 1–5.

Wherefore, having thus described our invention, we claim:

1. In a graphics plotter having a writing head adapted for traverse movement and holding a plurality of pens with writing tips, a pen capping mechanism comprising:
(a) a slider member adapted to move through an operative path and having an upper surface adapted to sealably mate with the writing tips of the pens, said member having a plurality of bores therethrough through which respective ones of the writing tips can pass to write, said bores being positioned such that as said member is moved through said operative path respective ones of said bores come into alignment with a pen tip such that only one pen tip at a time is in alignment with one of said bores; and,
(b) support means operably connected to the writing head for supporting said slider member for sliding movement adjacent said pen tips.

2. The pen capping mechanism of claim 1 wherein:
(a) said operative path is divided into equal steps; and,
(b) said bores are offset from alignment from respective ones of said pen tips in units of said steps whereby moving said member one of said steps will seal the tip of one of the pens and unseal another.

3. The pen capping mechanism of claim 2 wherein:
(a) said bores are all of a diameter d; and,
(b) said steps are of a distance equal to d.

4. The pen capping mechanism of claim 1 wherein:
(a) said support means comprises a track portion carried by the writing head; and,
(b) said slider member is adapted to slidably mate with said track portion whereby one said slider member can be slid out of said track portion and another said slider member can be slid into said track portion to change the configuration of said bores.

5. The pen capping mechanism of claim 4 and additionally comprising:
a pair of stops disposed at known fixed locations adjacent respective ends of the traverse movement of the writing head and adapted to contact said slider member and urge it along said track portion in one direction as the writing head moves in the opposite direction whereby said slider member can be positioned at a desired position by moving the writing head to fixed relationships with respect to said stops.

6. The pen capping mechanism of claim 1 wherein:
said slider member additionally includes slots connecting adjacent positions wherein capping of a pen's writing tip is not desired at more than one position of said slider member.

7. The pen capping mechanism of claim 4 and additionally comprising:
detent means operably connected between the writing head and said slider member for releasably holding said slider member in positions with the writing tips aligned with said bores.

8. The pen capping mechanism of claim 1 wherein:
said upper surface is covered with a tape having the sliding and sealing qualities of polytetraflouroethylene tape.

9. In a graphics plotter having a writing head adapted for traverse movement and holding a plurality of pens with writing tips and including a pen capping mechanism for selectively sealing and unsealing the writing tips, the improvement comprising:
(a) a track portion carried by the writing head; and,
(b) a slider member adapted to slideably mate with said track portion and move through an operative path, said member including an upper surface adapted to sealably mate with the writing tips of the pens and further including means for selectively sealing and unsealing the writing tips, comprising:

said slider member having a plurality of bores therethrough through which respective ones of the pen tips can pass to write, said bores being positioned such that as said member is moved through said operative path respective ones of said bores come into alignment with a pen tip such that only one pen tip at a time is in alignment with one of said bores.

10. The improvement of claim 9 wherein:

said slider member is adapted to both removably and slideably mate with said track portion whereby one said slider member can be slid out of said track portion and another said slider member can be slid into said track portion to change the configuration of said bores.

11. The improvement of claim 9 and additionally comprising:

a pair of stops disposed at known fixed locations adjacent respective ends of the traverse movement of the writing head and adapted to contact said slider member and urge it along said track portion in one direction as the writing head moves in the opposite direction whereby said slider member can be positioned at a desired position by moving the writing head to fixed relationships with respect to said stops.

12. The improvement of claim 9 wherein:

said slider member additionally includes slots connecting adjacent positions wherein capping of a pen's writing tip is not desired at more than one position of said slider member.

13. The improvement of claim 9 and additionally comprising:

detent means operably connected between the writing head and said slider member for releasably holding said slider member in positions with the writing tips aligned with said bores.

14. The improvement of claim 9 wherein:

said upper surface is covered with a tape having the sliding and sealing qualities of polytetrafluoroethylene tape.

15. The improvement of claim 10 wherein:

(a) said operative path is divided into equal steps; and,
(b) said bores are offset from alignment from respective ones of said pen tips in units of said steps whereby moving said member one of said steps will seal the tip of one of the pens and unseal another.

16. The pen capping mechanism of claim 15 wherein:

(a) said bores are all of a diameter d; and,
(b) said steps are of a distance equal to d.

* * * * *